United States Patent
Bickford et al.

(10) Patent No.: US 9,552,447 B2
(45) Date of Patent: Jan. 24, 2017

(54) SYSTEMS AND METHODS FOR CONTROLLING INTEGRATED CIRCUIT CHIP TEMPERATURE USING TIMING CLOSURE-BASED ADAPTIVE FREQUENCY SCALING

(71) Applicant: GLOBALFOUNDRIES INC., Grand Cayman OT (KY)

(72) Inventors: Jeanne P. Bickford, Essex Junction, VT (US); Eric A. Foreman, Fairfax, VT (US); Mark W. Kuemerle, Essex Junction, VT (US); Susan K. Lichtensteiger, Essex Junction, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 76 days.

(21) Appl. No.: 14/695,091

(22) Filed: Apr. 24, 2015

(65) Prior Publication Data
US 2016/0314229 A1    Oct. 27, 2016

(51) Int. Cl.
*G06F 9/455* (2006.01)
*G06F 17/50* (2006.01)
*G06F 1/10* (2006.01)

(52) U.S. Cl.
CPC ............. *G06F 17/5031* (2013.01); *G06F 1/10* (2013.01)

(58) Field of Classification Search
USPC .................. 716/108, 112, 113, 132, 134, 138
See application file for complete search history.

(56) References Cited

U.S. PATENT DOCUMENTS

| | | |
|---|---|---|
| 6,868,503 B1 | 3/2005 | Maksimovic et al. |
| 7,120,804 B2 | 10/2006 | Tschanz et al. |
| 7,149,903 B1 | 12/2006 | Chan et al. |
| 7,417,482 B2 | 8/2008 | Elgebaly et al. |
| 7,493,149 B1 | 2/2009 | Doyle et al. |

(Continued)

OTHER PUBLICATIONS

Dhar et al., "Closed Loop Adaptive Voltage Scaling Controller for Standard Cell ASICs", Proceedings of the 2002 International Symposium on Low Power Electronics and Design, ACM, 2002, pp. 1-5.

(Continued)

*Primary Examiner* — Brian Ngo
(74) *Attorney, Agent, or Firm* — Gibb & Riley, LLC; David A. Cain, Esq.

(57) ABSTRACT

Disclosed are a system and method that control integrated circuit chip temperature using frequency scaling based on predetermined temperature-frequency settings. During integrated circuit chip operation, a controller causes a variable clock signal generator to adjust the frequency of a clock signal that coordinates operations of an integrated circuit chip based on the temperature of the integrated circuit chip and on predetermined temperature-frequency settings. The temperature-frequency settings are predetermined in order to ensure that the frequency of the clock signal, as adjusted, remains sufficiently high to meet a chip performance specification, but sufficiently low to prevent the temperature from rising above a predetermined maximum temperature in order to limit power consumption. Also disclosed is a method of generating such temperature-frequency settings during timing analysis.

19 Claims, 10 Drawing Sheets

(56) References Cited

U.S. PATENT DOCUMENTS

| | | |
|---|---|---|
| 8,543,960 B1 | 9/2013 | Bickford et al. |
| 8,661,274 B2 | 2/2014 | Hansquine et al. |
| 8,839,165 B2 | 9/2014 | Bickford et al. |
| 2010/0138684 A1* | 6/2010 | Kim ............... G06F 1/3225 713/601 |
| 2014/0132334 A1* | 5/2014 | Park ............... G11C 5/14 327/513 |
| 2015/0033081 A1 | 1/2015 | Bickford et al. |

OTHER PUBLICATIONS

Elgebaly et al., "Efficient Adaptive Voltage Scaling System Through OnChip Critical Path Emulation", Proceedings of the 2004 International Symposium on Low Power Electronics and Design, ACM, 2004, pp. 375-380.

Miermont et al., "A Power Supply Selector for Energy- and Area-Efficient Local Dynamic Voltage Scaling", Integrated Circuit and System Design, Power and Timing Modeling, Optimization and Simulation, Springer Berlin Heidelberg, 2007, pp. 556-565.

Shang et al., "Dynamic Voltage Scaling with Links for Power Optimization of Interconnection Networks", High-Performance Computer Architecture, 2003, HPCA-9 2003. Proceedings of the Ninth International Symposium on IEEE, 2003, pp. 1-12.

Wirnshofer et al., "A Variation-Aware Adaptive Voltage Scaling Technique based on In-Situ Delay Monitoring", Design and Diagnostics of Electronic Circuits & Systems (DDECS), 14th International Symposium on IEEE, 2011, pp. 1-6.

\* cited by examiner

| Frequency | Temperature |
|---|---|
| $x$ Hz | $T < m\ °C$ |
| $y$ Hz | $T \geq m\ °C$ |

| Frequency | Temperature |
|---|---|
| $x$ Hz | $T < m\ °C$ |
| $y$ Hz | $m\ °C \leq T < n\ °C$ |
| $z$ HZ | $T \geq n\ °C$ |

| Frequency | Temperature |
|---|---|
| $x$ Hz | $T = m\ °C$ |
| $x$ Hz $-q$Hz | $T = m\ °C + p\ °C$ |
| $x$ Hz $-2q$Hz | $T = m\ °C + 2p\ °C$ |
| ⋮ | ⋮ |
| $z$ HZ | $T = n\ °C$ |

SYSTEMS AND METHODS FOR CONTROLLING INTEGRATED CIRCUIT CHIP TEMPERATURE USING TIMING CLOSURE-BASED ADAPTIVE FREQUENCY SCALING

BACKGROUND

The present disclosure relates to the effect of temperature variations on integrated circuit chip power consumption and, particularly, to a system and method for controlling integrated circuit chip temperature and, thereby power consumption, using timing closure-based adaptive frequency scaling.

Total power consumption is a key concern of integrated circuit (IC) chip designers. Those skilled in the art will recognize that there are two components to total power consumption: dynamic power consumption, which refers to power consumption during active operation of the IC chip; and static power consumption, which is refers to power consumption with the IC chip is inactive. More specifically, dynamic power consumption refers to the amount of power required to operate an IC chip and is proportional to the value of the supply voltage (Vdd) squared and to the frequency of operation. Static power consumption refers to the amount of power consumed by the IC chip when it is inactive and is proportional to the value of the supply voltage (Vdd) and to the leakage current. Leakage current refers to the total current that flows through the device when the IC chip is in active. Those skilled in the art will recognize that there is an exponential relationship between the supply voltage and temperature and also an exponential relationship between temperature and the leakage current. Since leakage current and, thereby static power consumption at high temperature is a huge contribution to the total power consumption, techniques are often employed to reduce IC chip temperature when some predetermined maximum temperature is achieved. These techniques can include, for example, reducing the activity level on the IC chip and/or reducing the supply voltage (Vdd) to the IC chip. However, since the activity level and/or supply voltage can only be reduced when the IC chip is operating above a minimum activity level and/or above a minimum supply voltage, respectively, such techniques may not be available to reduce temperature when necessary.

SUMMARY

In view of the foregoing disclosed herein are embodiments of a system and method that control integrated circuit chip temperature using frequency scaling based on predetermined temperature-frequency settings. Specifically, during integrated circuit chip operation, a controller causes a variable clock signal generator to adjust the frequency of a clock signal that coordinates operations of an integrated circuit chip based on the temperature of the integrated circuit chip and on predetermined temperature-frequency settings. The temperature-frequency settings are predetermined in order to ensure that the frequency of the clock signal, as adjusted, remains sufficiently high to meet a chip performance specification, but sufficiently low to prevent the temperature from rising above a predetermined maximum temperature in order to limit power consumption. Also disclosed herein are embodiments of a method of generating such temperature-frequency settings during timing analysis.

More particularly, disclosed herein are embodiments of a system that uses frequency scaling based on predetermined temperature-frequency settings to control the temperature of an integrated circuit chip, which is incorporated into a product. The system can comprise a temperature sensor, a memory, a variable clock signal generator, and a controller, which is in communication with the temperature sensor and memory and which is operably connected to the variable clock signal generator. These components can all be on-chip components of the integrated circuit chip. Alternatively, any one or more of these components can be separate from the integrated circuit chip (e.g., components of the product).

In any case, the variable clock signal generator can generate a clock signal that coordinates operations of the integrated circuit chip. The temperature sensor can determine the temperature of the integrated circuit chip. The memory can store temperature-frequency settings, which were predetermined during timing analysis. The controller can receive an indication of the temperature from the temperature sensor and can access the temperature-frequency settings. The controller can then use the temperature-frequency settings to determine the optimal frequency for the clock signal given the temperature. The controller can further cause the variable clock signal generator to adjust the clock signal such that the clock signal has that optimal frequency.

It should be noted that the temperature-frequency settings are predetermined during a timing analysis based on the design of the integrated circuit chip so that, when these temperature-frequency settings are used to adjust the clock signal, the optimal frequency of the clock signal will be sufficiently high to meet a performance specification for the integrated circuit chip and sufficiently low to prevent the temperature from rising above a predetermined maximum temperature.

Also disclosed herein are embodiments of a method that uses frequency scaling based on predetermined temperature-frequency settings to control the temperature of an integrated circuit chip, which is incorporated into a product.

The method can comprise receiving (e.g., by a controller from a temperature sensor) an indication of a temperature of the integrated circuit chip, as determined by the temperature sensor. The method can further comprise accessing (e.g., by the controller from a memory) temperature-frequency settings, which are stored in the memory and, given the temperature, using (e.g., by the controller) the temperature-frequency settings to determine the optimal frequency for a clock signal, which is generated by a variable clock signal generator and which coordinates operations of the integrated circuit chip. The method can further comprise causing (e.g., by the controller) the variable clock signal generator to adjust the clock signal such that the clock signal has that optimal frequency.

It should be noted that the temperature-frequency settings are predetermined during a timing analysis based on the design of the integrated circuit chip so that, when these temperature-frequency settings are used to adjust the clock signal, the optimal frequency of the clock signal will be sufficiently high to meet a performance specification for the integrated circuit chip and sufficiently low to prevent the temperature from rising above a predetermined maximum temperature.

Also disclosed herein are embodiments of a method of generating such temperature-frequency settings during timing analysis. Specifically, this method can comprise creating a design for an integrated circuit chip and determining a specification for a performance parameter (i.e., a performance specification of the integrated circuit chip).

Subsequently, a timing analysis can be performed based on the design of the integrated circuit chip. This timing analysis can specifically be performed in order to characterize relationships between the frequency of a clock signal, which coordinates operations of the integrated circuit chip, and the performance parameter, between the frequency of the clock signal and the temperature of the integrated circuit chip, and between the performance parameter and the temperature. The characterization of these relationships can then be used to determine temperature-frequency settings for the integrated circuit chip.

The temperature-frequency settings can be stored in a memory, which is accessible by a controller that, after manufacture of the integrated circuit chip and after incorporation of the integrated circuit chip into a product, performs the following processes: receives an indication of a temperature of an integrated circuit chip from a temperature sensor; accesses the temperature-frequency settings from the memory; given the temperature, uses the temperature-frequency settings to determine an optimal frequency for the clock signal; and causes a variable clock signal generator to adjust the clock signal such that the clock signal, as generated and output by the variable clock signal generator for coordinating operations of the integrated circuit chip, has the optimal frequency.

It should be noted that the temperature-frequency settings are specifically determined during the timing analysis so that, when the temperature-frequency settings are to adjust the clock signal, the optimal frequency of the clock signal will be sufficiently high to meet the performance specification and sufficiently low to prevent the temperature from rising above a predetermined maximum temperature.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, total power consumption is a key concern of integrated circuit (IC) chip designers. Those skilled in the art will recognize that there are two components to total power consumption: dynamic power consumption, which refers to power consumption during active operation of the IC chip; and static power consumption, which is refers to power consumption with the IC chip is inactive. More specifically, dynamic power consumption refers to the amount of power required to operate an IC chip and is proportional to the value of the supply voltage (Vdd) squared and to the frequency of operation. Static power consumption refers to the amount of power consumed by the IC chip when it is inactive and is proportional to the value of the supply voltage (Vdd) and to the leakage current. Leakage current refers to the total current that flows through the device when the IC chip is in active. Those skilled in the art will recognize that there is an exponential relationship between the supply voltage and temperature and also an exponential relationship between temperature and the leakage current. Since leakage current and, thereby static power consumption at high temperature is a huge contribution to the total power consumption, techniques are often employed to reduce IC chip temperature when some predetermined maximum temperature is achieved. These techniques can include, for example, reducing the activity level on the IC chip and/or reducing the supply voltage (Vdd) to the IC chip. However, since the activity level and/or supply voltage can only be reduced when the IC chip is operating above a minimum activity level and/or above a minimum supply voltage, respectively, such techniques may not be available to reduce temperature when necessary.

In view of the foregoing disclosed herein are embodiments of a system and method that control integrated circuit chip temperature using frequency scaling based on predetermined temperature-frequency settings. Specifically, during integrated circuit chip operation, a controller causes a variable clock signal generator to adjust the frequency of a clock signal that coordinates operations of an integrated circuit chip based on the temperature of the integrated circuit chip and on predetermined temperature-frequency settings. The temperature-frequency settings are predetermined in order to ensure that the frequency of the clock signal, as adjusted, remains sufficiently high to meet a chip performance specification, but sufficiently low to prevent the temperature from rising above a predetermined maximum temperature in order to limit power consumption. Also disclosed herein are embodiments of a method of generating such temperature-frequency settings during timing analysis.

Figure 1A:
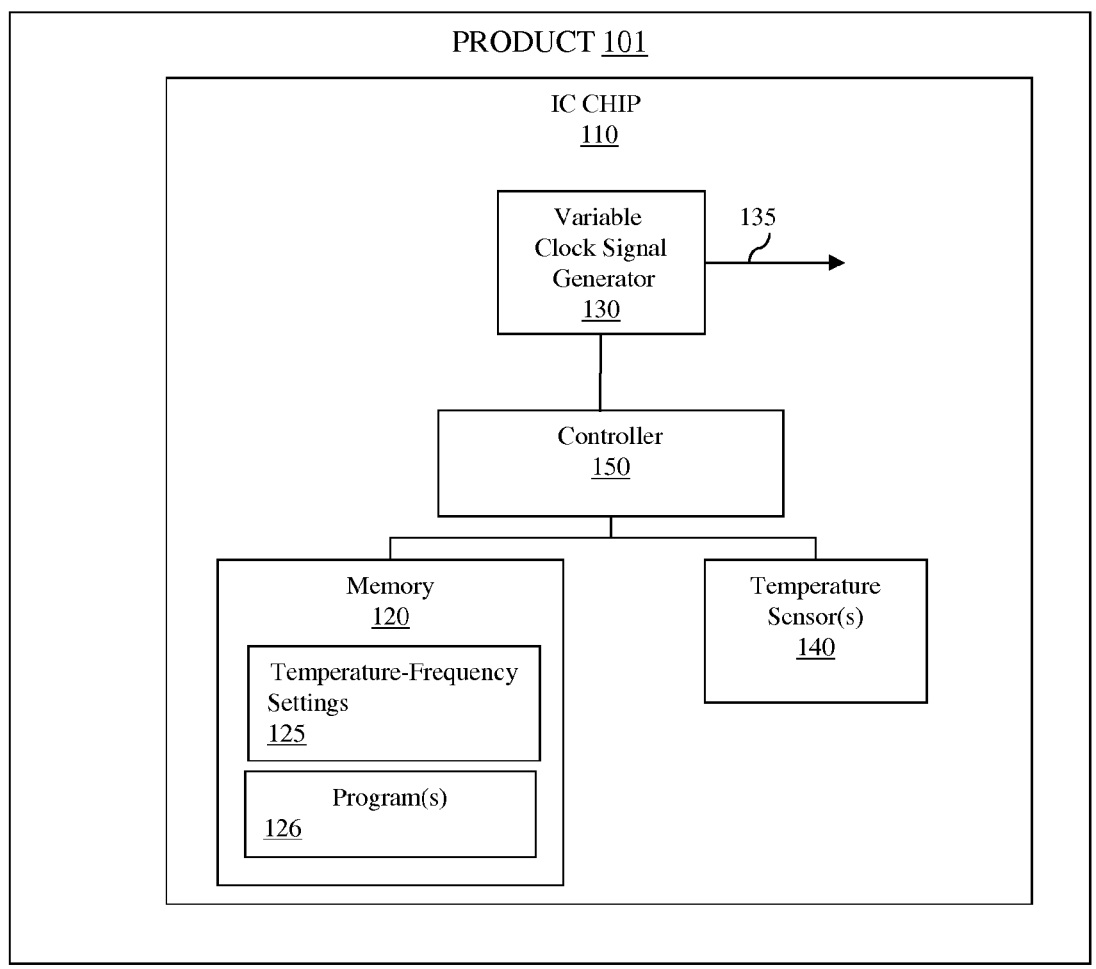
FIG. 1A is a schematic diagram illustrating an embodiment of a system that uses frequency scaling based on predetermined temperature-frequency settings to control the temperature of an integrated circuit chip incorporated into a product.
Figure 1B:
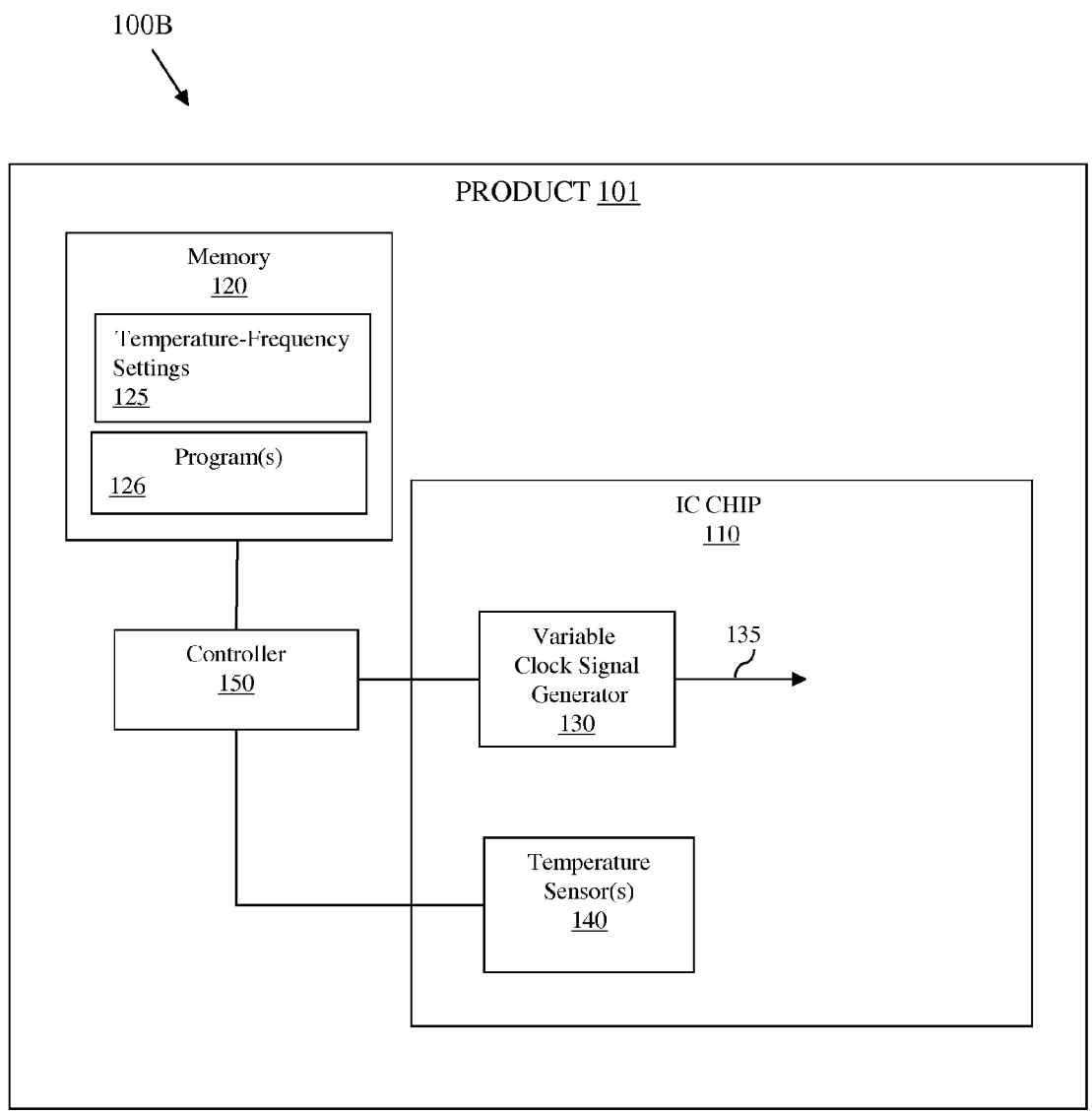
FIG. 1B is a schematic diagram illustrating an embodiment of a system that uses frequency scaling based on predetermined temperature-frequency settings to control the temperature of an integrated circuit chip incorporated into a product.

More particularly, referring to FIGS. 1A and 1B, disclosed herein are embodiments of a system 100A, 100B, respectively, that uses frequency scaling based on predetermined temperature-frequency settings to control the temperature of an integrated circuit chip 110, which is incorporated into a product 101.

The product 101 can be either (a) an intermediate product, such as a motherboard or other printed circuit board, or (b) an end product (e.g., any product that includes integrated circuit chips, ranging from toys and other low-end applications to advanced computer products having a display, a keyboard or other input device, and a central processor). The integrated circuit chip 110 can be incorporated into the product 101 (e.g., affixed to the motherboard or printed circuit board) for performing any suitable function(s) within that product 101.

The system 100A, 100B can comprise one or more temperature sensors 140, a memory 120, a variable clock signal generator 130, and a controller 150, which is in communication with the temperature sensor(s) 140 and memory 120 and which is operably connected to the variable clock signal generator 130. As illustrated in the system 100A shown in FIG. 1A, all of these components (i.e., the temperature sensor(s) 140, memory 120, variable clock signal generator 130 and controller 150) can be on-chip components of the integrated circuit chip 110. Alternatively, as illustrated in the system 100B shown in FIG. 1B, any one or more of these components can be separate from the integrated circuit chip (e.g., components of the product). For example, the temperature sensor(s) 140 and variable clock signal generator 130 can be on-chip components of the integrated circuit chip 110, whereas the memory 120 and controller 150 can be separate from the integrated circuit chip (i.e., components of the product 101 that are not on the integrated circuit chip 110).

In any case, the variable clock signal generator 130 (also referred to herein as a variable frequency clock generation circuit) can generate and output (i.e., can be adapted to generate and output, can be configured to generate and output, etc.) a clock signal 135 that coordinates the operations of the integrated circuit chip. Those skilled in the art will recognize that a variable clock signal generator that is capable of, not only generating and outputting a clock signal, but also selectively varying the frequency that clock signal. Variable clock signal generators that can vary the frequency of a clock signal between two or more different frequencies are well known in the art and, thus, the details of such clock signal generators are omitted from this specification in order to allow the reader to focus on the salient aspects of the disclosed system.

The one or more temperature sensors 140 (also referred to herein as temperature sensing circuits or temperature monitoring circuits) can determine (i.e., can be adapted to determine, can be configured to determine, etc.) the temperature of the integrated circuit chip 110 at one or more locations, respectively, on the integrated circuit chip 110. Those skilled in the art will recognize that on-chip temperature sensors typically determine the temperature by measuring the forward voltage of a device (e.g., a diode) for which the relationship between the forward voltage and temperature has been previously characterized. It should, however, be understood that any of multiple different types of temperature sensors, which determine temperature using different techniques, could be incorporated into the system 100A, 100B. Such temperature sensors are well known in the art and, thus, the details of such sensors are omitted from this specification in order to allow the reader to focus on the salient aspects of the invention.

The memory 120 can comprise, for example, a non-volatile memory. This memory 120 can store temperature-frequency settings 125, which were predetermined during timing analysis. The memory 120 can also store a program of instructions. The temperature-frequency settings 125 can specifically associated different temperatures with different frequencies, as discussed in greater detail below and can be in the form of a table.

The controller 150 can comprise a processor. For example, as illustrated in system 100A of FIG. 1A, the controller 150 can comprise a supervisory microprocessor on the integrated circuit chip 110. Alternatively, as illustrated in the system 100B of FIG. 1B, the controller 150 can comprise a processing component of the product 101 and can be separate from the integrated circuit chip 110. In any case, the controller 150 can receive an indication of the temperature from the temperature sensor(s) 140 and can perform (i.e., can be adapted to perform, can be configured to perform, can execute a program 126 of instructions, which is also stored in memory 120, to perform, etc.) various process steps in order to adjust the frequency of the integrated circuit chip 110, as necessary and, thereby to adjust the temperature of the integrated circuit chip. Adjusting temperature in this manner can effectively limit power consumption at high temperatures.

Specifically, the controller 150 can access the temperature-frequency settings 125 and, given the temperature, as determined by the temperature sensor(s) 140, can use the temperature-frequency settings 125 to determine the optimal frequency for the clock signal 135, which is generated by the variable clock signal generator 130 and which coordinates operations of the integrated circuit chip 110. It should be noted that, if the controller 150 receives indications of chip temperature from multiple temperature sensors 140, the optimal frequency can, for example, be determined based on the average temperature (e.g., the controller 150 can determine the average temperature of all of the temperatures from all of the temperature sensors and use that average temperature to determine the optimal frequency) or on the highest temperature (e.g., the controller 150 can determine the highest temperature of all of the temperatures from all of the temperature sensors and can use that highest temperature to determine the optimal frequency).

In any case, the controller 150 can determine the optimal frequency by comparing the temperature to the temperature-frequency settings 125 and finding the frequency that matches the temperature. Then, the controller 150 can cause the variable clock signal generator 130 to adjust the clock signal 135 (i.e., to increase or decrease the frequency of the clock signal), as necessary, such that the clock signal 135 has the optimal frequency. That is, the controller 150 can communicate an indication of the optimal frequency for the clock signal 135 to the variable clock signal generator 130 and, if the optimal frequency of the clock signal 135 is different from the current frequency of the clock signal 135, the variable clock signal generator 130 can vary (i.e., increase or decrease) the clock signal 135, as necessary, thereby adjusting the temperature of the integrated circuit chip 110.

It should be noted that the temperature-frequency settings 125 are predetermined during a timing analysis, as discussed in greater detail below, based on the design of the integrated circuit chip 110 so that, when these temperature-frequency settings 125 are used by the controller 150 to cause the variable clock signal generator 130 to adjust the clock signal 135, the optimal frequency of the clock signal 135 will be sufficiently high to meet a performance specification for the integrated circuit chip 110 (i.e., a specification for a performance parameter, such as a timing parameter (e.g., for delay)) and also sufficiently low to prevent the temperature from rising above a predetermined maximum temperature.

It should further be noted that the numbers of different temperature-frequency settings 125, which are predetermined during timing analysis and which are stored in memory 120 and used as described above, can vary, as illustrated in the examples shown in FIGS. 2A-2B, 3A-3B, and 4A-4B.

Figures 2A, 2B:
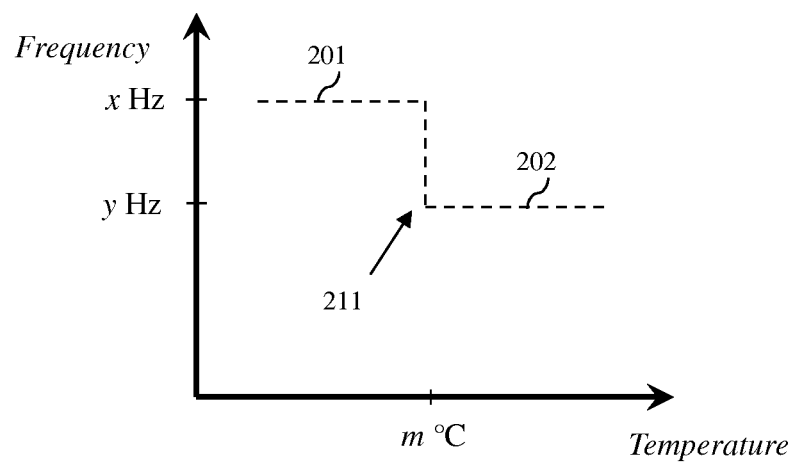
FIG. 2A is a graph illustrating exemplary temperature-frequency settings that specify a threshold temperature and at least two different clock frequencies.
FIG. 2B is a table corresponding to the graph of FIG. 2A.
Figures 3A, 3B:
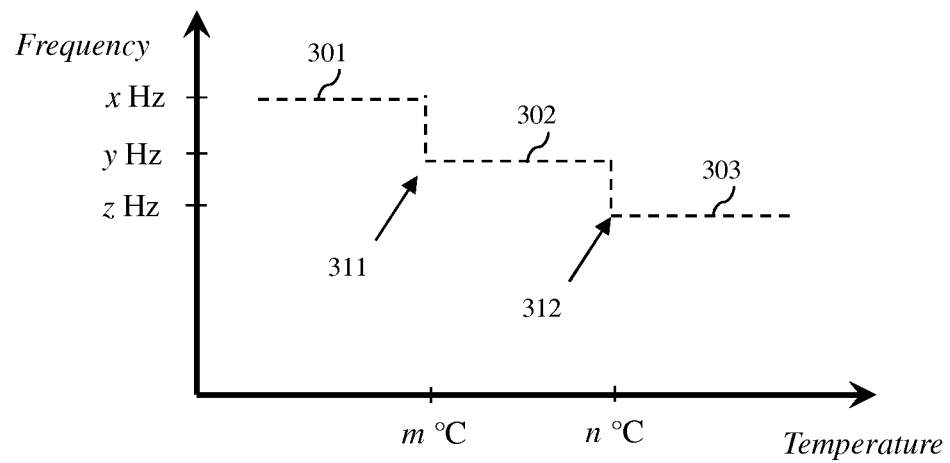
FIG. 3A is a graph illustrating exemplary temperature frequency settings that specify at least two threshold temperatures and at least two different clock signal frequencies.
FIG. 3B is a table corresponding to the graph of FIG. 2A.

Specifically, as illustrated in the graph and table of FIGS. 2A-2B, respectively, the temperature-frequency settings 125 can specify a threshold temperature 211 (e.g., m ° C.), a first frequency 201 (e.g., x Hz) for the clock signal 135 and, particularly, a predetermined maximum frequency for the clock signal 135 for use when the temperature of the integrated circuit chip 110 is below the threshold temperature (i.e., when T<m ° C.). The temperature-frequencies settings 125 can also specify a second frequency 202 (e.g., y Hz) for the clock signal 135 and, particularly, a predetermined minimum frequency for the clock signal 135 for use when the temperature of the integrated circuit chip 110 is at or above the threshold temperature (i.e., when T≥m ° C.). The second frequency 202 will be lower than the first frequency 201 (i.e., y Hz<x Hz) in an attempt to reduce the temperature of the integrated circuit chip 110, but will still be sufficiently high to meet the performance specification for the integrated circuit chip 110.

Alternatively, the temperature frequency settings 125 can specify multiple threshold temperatures and frequencies. For example, as illustrated in the graph and table of FIGS. 3A-3B, respectively, the temperature-frequency settings 125 can comprise at least two threshold temperatures: a first threshold temperature 311 (e.g., m ° C.) and a second threshold temperature 312 (e.g., n ° C.), which is higher than the first threshold temperature 311. The temperature-frequency settings 125 can also comprise at least two different clock signal frequencies: a first frequency 301 (e.g., x Hz) and, particularly, a predetermined maximum frequency for use when the temperature is below the first threshold temperature 311 (i.e., when T<m ° C.), a second frequency 302 (e.g., y Hz) that is lower than the first frequency 301 and for use when the temperature is at or above the first threshold temperature 311 and below the second threshold temperature 312 (i.e., when m ° C.≤T<n ° C.); and a third frequency 303 (e.g., z Hz) and, particularly, a predetermined minimum frequency that is lower than the second frequency 302 and for use when the temperature is at or above the second threshold temperature 312 (i.e., when T≥n ° C.). The second frequency 302 will be lower than the first frequency 301 and the third frequency 303 will be lower than the second frequency 302 (i.e., y Hz<x Hz<z Hz) in an attempt to reduce the temperature of the integrated circuit chip 110, but these lower frequencies will each still be sufficiently high to meet the performance specification for the integrated circuit chip 110.

Figures 4A, 4B:
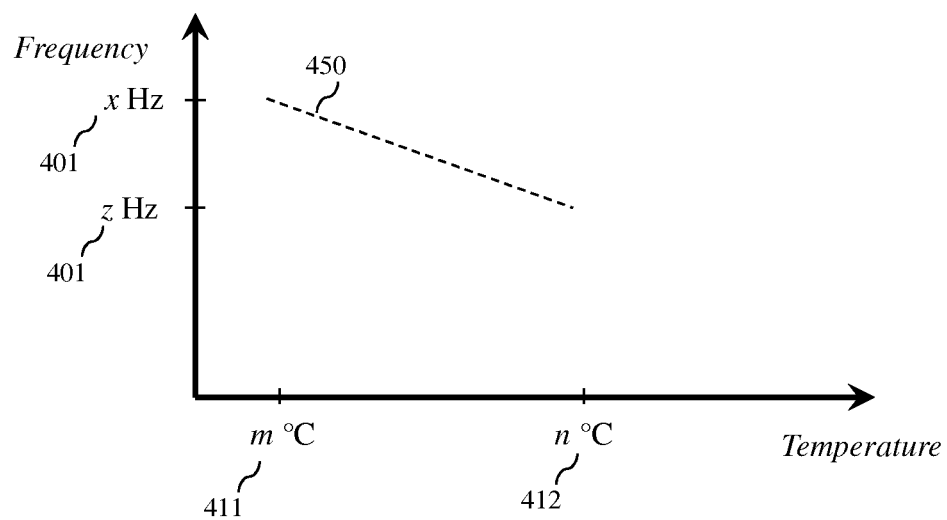
FIG. 4A is a graph illustrating exemplary temperature frequency settings that specify multiple temperatures and multiple different clock signal frequencies.
FIG. 4B is a table corresponding to the graph of FIG. 2A.

Similarly, as illustrated in the graph and table of FIGS. 4A-4B, respectively, the temperature-frequency settings 125 can specify a sufficient number of temperatures and frequencies to allow for essentially continuous frequency adjustment. That is, the temperature-frequency settings 125 can indicate an essentially linear relationship 450 (i.e., a linear temperature-frequency relationship) between a range of frequencies and a range of temperatures. The range of frequencies can be from a first frequency 401 (e.g., x Hz) and, particularly, a predetermined maximum frequency to a second frequency 402 (e.g., z Hz) and, particularly, a predetermined minimum frequency. The range of temperatures can be between a first temperature 411 (e.g., m ° C.), which is a minimum operating temperature of the integrated circuit chip 110, and a second temperature 412 (e.g., n ° C.), which is a maximum operating temperature of the integrated circuit chip 110. The slope of this linear relationship can used to dictate the temperature-frequency settings. For example, for each increase in temperature of p ° C., the frequency can be set to decrease by q Hz. By fitting the temperature-frequency settings 125 to fit this linear relationship, the frequency of the clock signal can essentially be automatically and continuously adjusted in response to temperature changes.

Figure 5:
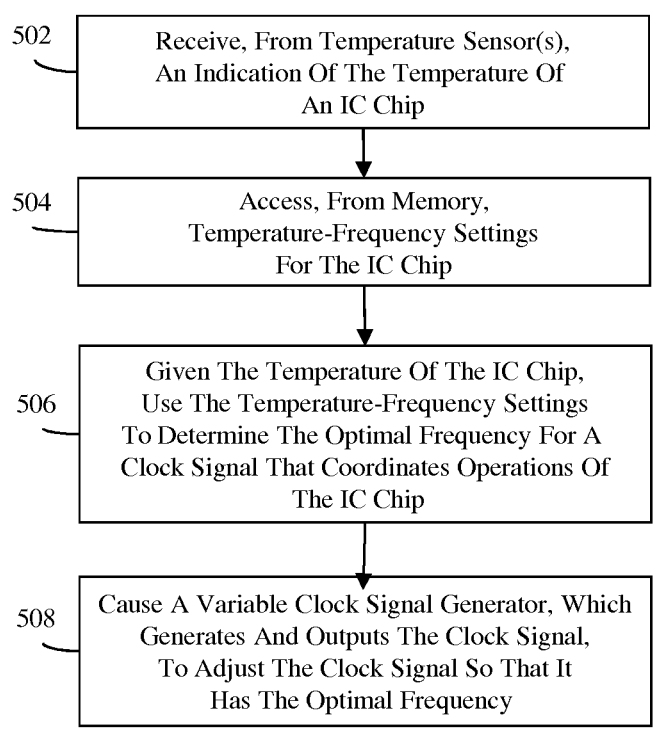
FIG. 5 is a flow diagram illustrating a method that uses frequency scaling based on predetermined temperature-frequency settings to control the temperature of an integrated circuit chip incorporated into a product.

Referring to the flow diagram of FIG. 5 in combination with FIGS. 1A and 1B, also disclosed herein are embodiments of a method that uses frequency scaling based on predetermined temperature-frequency settings to control the temperature of an integrated circuit chip 110, which is incorporated into a product 101.

The method can comprise providing a system, such as the system 100A or 100B described in detail above, which comprises one or more temperature sensors 140 that determine the temperature of an integrated circuit chip 110, a memory 120 that stores temperature-frequency settings 125 for the integrated circuit chip 110, a variable clock signal generator 130 that generates a clock signal to coordinate operations of the integrated circuit chip 110, and a controller 150, which is in communication with the temperature sensor(s) 140 and memory 120 and which is operably connected to the variable clock signal generator 130. As illustrated in the system 100A shown in FIG. 1A, all of these components (i.e., the temperature sensor(s) 140, memory 120, variable clock signal generator 130 and controller 150) can be on-chip components of the integrated circuit chip 110. Alternatively, as illustrated in the system 100B shown in FIG. 1B, any one or more of these components can be separate from the integrated circuit chip (e.g., components of the product). For example, the temperature sensor(s) 140 and variable clock signal generator 130 can be on-chip components of the integrated circuit chip 110, whereas the memory 120 and controller 150 can be separate from the integrated circuit chip (i.e., components of the product 101 that are not on the integrated circuit chip 110).

The method can further comprise receiving, by the controller 150 from the temperature sensor(s) 140, an indication of the temperature of the integrated circuit chip 110 (502). Then, the temperature-frequency settings 125 can be accessed (e.g., by the controller 150 from the memory 120) and, given the temperature can be used (e.g., by the controller 150) to determine the optimal frequency for the clock signal 135 (504)-(506). It should be noted that, if the chip temperature indications are received from multiple temperature sensors 140, the optimal frequency can, for example, be determined at process 506 based on the average temperature (e.g., the average temperature of all of the temperatures from all of the temperature sensors can be determined and used to determine the optimal frequency) or on the highest temperature (e.g., the highest temperature of all of the temperatures from all of the temperature sensors can be determined and used to determine the optimal frequency). In any case, the optimal frequency can be determined at process 506 by comparing the temperature to the temperature-frequency settings 125 and finding the frequency that matches that temperature.

The method can further comprise causing (e.g., by the controller 150) the variable clock signal generator 130 to automatically adjust the clock signal 135 (i.e., to increase or decrease the frequency of the clock signal), as necessary, such that the clock signal 135 has the optimal frequency (508). That is, an indication of the optimal frequency for the clock signal 135 can be communicated (e.g., by the controller 150) to the variable clock signal generator 130 and, if the optimal frequency of the clock signal 135 is different from the current frequency of the clock signal 135, the variable clock signal generator 130 can vary (i.e., increase or decrease) the clock signal 135, as necessary, thereby adjusting the temperature of the integrated circuit chip 110. Adjusting temperature in this manner can effectively limit power consumption at high temperatures.

It should be noted that the temperature-frequency settings 125 are predetermined during a timing analysis, as discussed in greater detail below, based on the design of the integrated circuit chip 110 so that, when these temperature-frequency settings 125 are used to adjust the clock signal 135, the optimal frequency of the clock signal 135 will be sufficiently high to meet a performance specification for the integrated circuit chip 110 (i.e., a specification for a performance parameter, such as a timing parameter (e.g., for delay)) and also sufficiently low to prevent the temperature from rising above a predetermined maximum temperature.

It should further be noted that the numbers of different temperature-frequency settings 125, which are predetermined during timing analysis and which are stored in memory 120 and used as described above, can vary, as illustrated in the examples shown in FIGS. 2A-2B, 3A-3B, and 4A-4B and also described in detail above.

Figure 6:
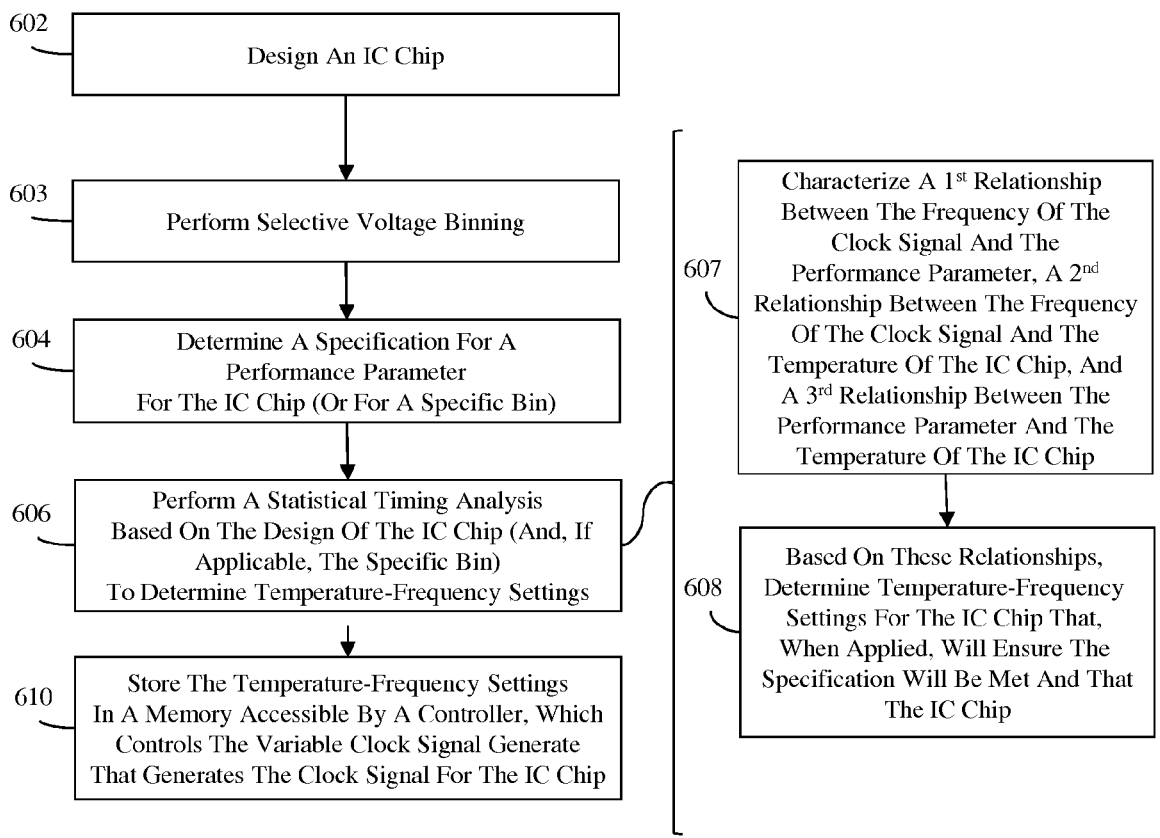
FIG. 6 is a flow diagram illustrating a method of generating temperature-frequency settings, which are used in the systems of FIGS. 1A and 1B and also the method of FIG. 5.

Referring to the flow diagram of FIG. 6, also disclosed herein are embodiments of a method of generating the temperature-frequency settings 125, which are used in the system 100A, 110B of FIGS. 1A and 1B, respectively, and also the method of FIG. 5.

Figure 8:
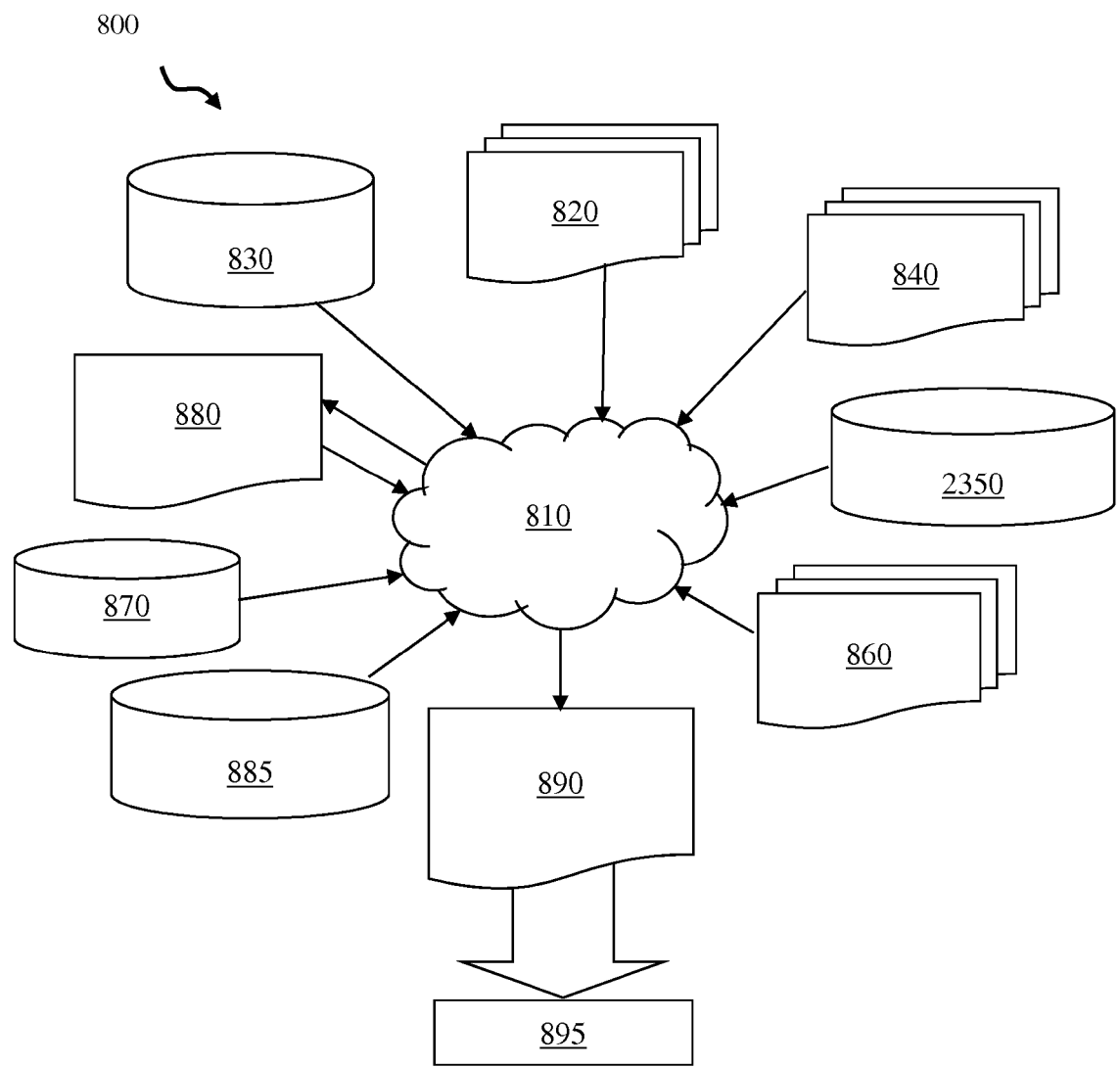
FIG. 8 illustrates an exemplary design flow.

Specifically, this method can comprise creating a design for an integrated circuit chip 110, which is to be incorporated into a product 101 (602). The design can be created, for example, based on user input and using a computer system executing a computer-aided design program. FIG. 8 and the related text below illustrate an exemplary design flow that can be used to design such an integrated circuit chip. However, it should be understood that FIG. 8 is not intended to be limiting and that any suitable design techniques could be used.

Additionally, the method can comprise determining a performance specification for the integrated circuit chip 110 (604). Specifically, workload planning for the integrated circuit chip 110 can be performed and, during such workload planning, a specification for a performance parameter, such as a timing parameter (e.g., delay), of the integrated circuit chip 110 can be determined.

Subsequently, a timing analysis and, particularly, a statistical timing analysis can be performed based on the design the integrated circuit chip 110 in order to close timing over possible temperature-frequency space (i.e., over the range of possible operating temperatures and operating frequencies) (606). This statistical timing analysis can specifically be performed in order to characterize relationships between the frequency of a clock signal 135, which coordinates operations of the integrated circuit chip 110, and the performance parameter, between the frequency of the clock signal 135 and the temperature of the integrated circuit chip 110, and between the performance parameter and the temperature (607). The characterization of these relationships can then be used to determine temperature-frequency settings 125 for the integrated circuit chip 110 (608).

The temperature-frequency settings 125 determined at processes 606-608 can be stored in a memory 120 (610), which is accessible by a controller 150 that, after manufacture of the integrated circuit chip 110 and after incorporation of the integrated circuit chip 110 into a product 101, performs the following processes: receives an indication of a temperature of an integrated circuit chip 110 from one or more temperature sensor(s) 140; accesses the temperature-frequency settings 125 from the memory 120; given the temperature, uses the temperature-frequency settings 125 to determine an optimal frequency for the clock signal 135; and causes a variable clock signal generator 130 to adjust the clock signal 135 such that the clock signal 135, as generated and output by the variable clock signal generator 130 for coordinating operations of the integrated circuit chip 110, has the optimal frequency.

It should be noted that the temperature-frequency settings 125 determined at processes 606-608 above and stored in the memory 120 at process 610 should specifically be determined so that, when these temperature-frequency settings 125 are used by the controller 150 to cause the variable clock signal generator 130 to adjust the clock signal 135, the optimal frequency of the clock signal 135 will be sufficiently high to meet the performance specification (i.e., the specification for the performance parameter (e.g., for delay)) and also sufficiently low to prevent the temperature from rising above a predetermined maximum temperature in order to limit power consumption.

Those skilled in the art will recognize that, during integrated circuit chip operation, the performance parameter may vary as a function of temperature and, depending upon both the performance parameter at issue and the integrated circuit technology at issue, the relationship between the performance parameter and temperature may be a direct relationship or an inverse relationship. When there is no temperature inversion, the performance will improve with an increase in temperature and vice versa. Contrarily, when there is temperature invention, the performance will degrade with an increase in temperature. Delay is a performance parameter that, depending upon the integrated circuit technology at issue, may or may not exhibit temperature inversion. Thus, the timing analysis performed at processes 606-608 specifically characterizes the relationship between the performance parameter and temperature, determining whether or not and how much temperature inversion is exhibited. In technologies where temperature inversion is not exhibited the temperature-frequency settings must consider that a decrease in clock signal frequency will result in a decrease in temperature (as indicated by the characterization of the relationship between clock signal frequency and temperature) and that this decrease in temperature will, in turn, result in a corresponding degradation of performance, such as an increase in delay (as indicated by the characterization of the relationship between the performance parameter and temperature). However, in technologies where temperature inversion is exhibited, concerns about failing to meet a performance specification when frequency is decreased are minimized because the decrease in frequency will result in a decrease in temperature, which, in turn, will improve performance (e.g., decrease in delay).

It should be noted that the numbers of different temperature-frequency settings 125, which are predetermined during this timing analysis at processes 606-608, can vary, as illustrated in the examples shown in FIGS. 2A-2B, 3A-3B, and 4A-4B.

Specifically, as illustrated in the graph and table of FIGS. 2A-2B, respectively, the temperature-frequency settings 125 determined during the timing analysis at process 606 can specify a threshold temperature 211 (e.g., m ° C.), a first frequency 201 (e.g., x Hz) for the clock signal 135 and, particularly, a predetermined maximum frequency for the clock signal 135 for use when the temperature of the integrated circuit chip 110 is below the threshold temperature (i.e., when T<m ° C.). The temperature-frequencies settings 125 can also specify a second frequency 202 (e.g., y Hz) for the clock signal 135 and, particularly, a predetermined minimum frequency for the clock signal 135 for use when the temperature of the integrated circuit chip 110 is at or above the threshold temperature (i.e., when T≥m ° C.). The second frequency 202 will be lower than the first frequency 201 (i.e., y Hz<x Hz) in an attempt to reduce the temperature of the integrated circuit chip 110, but will still be sufficiently high to meet the performance specification for the integrated circuit chip 110.

Alternatively, the temperature frequency settings 125 determined during the timing analysis at process 606 can specify multiple temperatures and frequencies. For example, as illustrated in the graph and table of FIGS. 3A-3B, respectively, the temperature-frequency settings 125 can comprise at least two threshold temperatures: a first threshold temperature 311 (e.g., m ° C.) and a second threshold temperature 312 (e.g., n ° C.), which is higher than the first threshold temperature 311. The temperature-frequency settings 125 can also comprise at least two different clock signal frequencies: a first frequency 301 (e.g., x Hz) and, particularly, a predetermined maximum frequency for use when the temperature is below the first threshold temperature 311 (i.e., when T<m ° C.), a second frequency 302 (e.g., y Hz) that is lower than the first frequency 301 and for use when the temperature is at or above the first threshold temperature 311 and below the second threshold temperature 312 (i.e., when m ° C.≤T<n ° C.); and a third frequency 303 (e.g., z Hz) and, particularly, a predetermined minimum frequency that is lower than the second frequency 302 and for use when the temperature is at or above the second threshold temperature 312 (i.e., when T≥n ° C.). The second frequency 302 will be lower than the first frequency 301 and the third frequency 303 will be lower than the second frequency 302 (i.e., y Hz<x Hz<z Hz) in an attempt to reduce the temperature of the integrated circuit chip 110, but these lower frequencies will each still be sufficiently high to meet the performance specification for the integrated circuit chip 110.

Similarly, as illustrated in the graph and table of FIGS. 4A-4B, respectively, the temperature-frequency settings 125 determined during the timing analysis at process 606 can specify a sufficient number of temperatures and frequencies to allow for essentially continuous frequency adjustment. That is, the temperature-frequency settings 125 can indicate an essentially linear relationship 450 (i.e., a linear temperature-frequency relationship) between a range of frequencies and a range of temperatures. The range of frequencies can be from a first frequency 401 (e.g., x Hz) and, particularly, a predetermined maximum frequency to a second frequency 402 (e.g., z Hz) and, particularly, a predetermined minimum frequency. The range of temperatures can be between a first temperature 411 (e.g., m ° C.), which is a minimum operating temperature of the integrated circuit chip 110, and a second temperature 412 (e.g., n ° C.), which is a maximum operating temperature of the integrated circuit chip 110. The slope of this linear relationship can used to dictate the temperature-frequency settings 125. For example, for each increase in temperature of p ° C., the frequency can be set to decrease by q Hz. Thus, these temperature-frequency settings 125 will allow the frequency of the integrated circuit chip to be automatically and continuously adjusted in response to temperature changes.

One exemplary technique for performing a statistical timing analysis to characterize the relationships between the frequency of a clock signal and a performance parameter, between the frequency of the clock signal and temperature, and between the performance parameter and temperature in order to determine the temperature-frequency settings at process 606 is described below.

For example, after performing a statistical static timing analysis (SSTA), a frequency-dependent timing test can be represented in canonical form. For a given sign-off slack of 0 psec, the slack can be replaced by 0 and the canonical form can be re-written to equate the clock period to all variational parameters. For a given clock cycle ($T_c$), the clock can be represented by the following canonical model for temperature, process voltage, and random variation:

$$T_c = t_0 + a_1 \Delta Vdd + a_2 \Delta \text{Temp} + a_3 \Delta P + r\Delta R, \quad (1)$$

where $t_0$ refers to the mean of the canonical clock period, $a_1\Delta Vdd$ refers to a sensitivity value associated with change in the supply voltage, $a_2\Delta \text{Temp}$ refers to a sensitivity value associated with change in the temperature, $a_3\Delta P$ refers to a sensitivity value associated with change in the performance parameter, and $r\Delta R$ refers to a sensitivity value associated with a random variation.

Given clock canonical model in expression (1) above, a variation in one of the values (e.g., Vdd) of the model will drive variations in the other values (e.g., in Temp, P, etc.) of the model in order to maintain the constant clock cycle $T_c$ so as to essentially balance the equation. This will result in a new canonical model, as follows:

$$T_c = t_0 + a_{1\_Vdd}\Delta Vdd + a_{2\_Vdd}\Delta \text{Temp} + a_{3\_Vdd}\Delta P + r\Delta R, \quad (2)$$

where $a_1\Delta Vdd$ is replaced by $a_{1\_Vdd}\Delta Vdd$, $a_2\Delta \text{Temp}$ is replaced by $a_{2\_Vdd}\Delta \text{Temp}$ and $a_3\Delta P$ is replaced by $a_{3\_Vdd}\Delta P$.

This same technique will be applied for the next state, when the clock period $t_0$ is varied. That is, given extended canonical model (2), a variation of the mean clock period $t_0$ from the initial model will drive variations in other values (e.g., in Vdd, Temp, and P) in order to maintain the constant clock cycle $T_c$. This will result in yet another new canonical model, as follows:

$$T_c = t_{0\_new} + a_{1\_Vdd\_Period}\Delta Vdd + a_{2\_Vdd\_Period}\Delta \text{Temp} + a_{3\_Vdd\_Period}\Delta P + r\Delta R \quad (3)$$

where $t_0$ is replaced by $t_{0\_New}$, $a_{1\_Vdd}\Delta Vdd$ is replaced by $a_{1\_Vdd\_Period}\Delta Vdd$, $a_{2\_Vdd}\Delta \text{Temp}$ is replaced by $a_{2\_Vdd\_Period}\Delta \text{Temp}$ and $a_{3\_Vdd}\Delta P$ is replaced by $a_{3\_Vdd\_Period}\Delta P$.

This same technique will be applied for each subsequent state in order to characterize all relationships represented in the canonical models. It should be noted that above-described canonical models show changes to sensitivities; however, these models are not intended to be limiting. It should be understood that the technique can, alternatively, be performed without changing the sensitivities but showing the amount of change occurs due to a variational parameter change.

As described above, the process 604 of determining the performance specification for the integrated circuit chip and the process 606 of performing the timing analysis are based simply on the design of an integrated circuit chip. However, optionally, before these processes are performed a process of selective voltage binning can be performed (603). That is, before the parameters for the timing analysis are defined and before the timing analysis is performed, the method can comprise performing selective voltage binning. During this selective voltage binning, multiple integrated circuit chips having the same design can be sorted into two or more different groups (referred to as bins) based on different operating speeds. These different operating speeds can, for example, be the result of process variations. Then, different first positive supply voltages can be assigned to the different groups based on the different operating speeds. For example, lower first supply voltages can be assigned to faster integrated circuit chips and higher first supply voltages can be assigned to slower integrated circuit chips. In this case, each different group (i.e., each different bin, slow to fast) can be associated with different performance specifications and separate timing analysis can be performed for each different group such that different temperature-frequency settings will be determined for each specific one of the different groups (e.g., as illustrated in the graph of FIG. 7).

Figure 7:
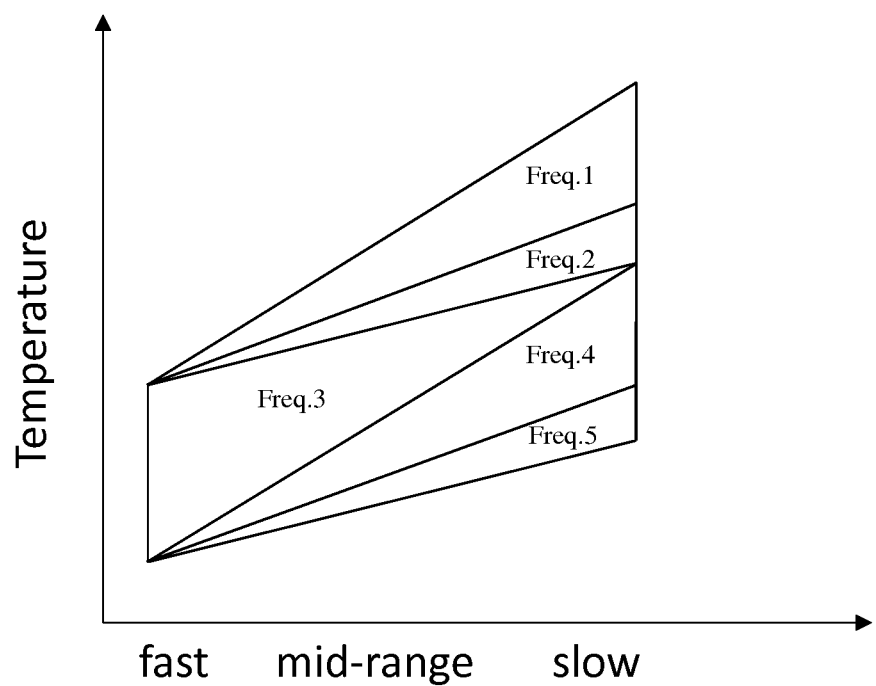
FIG. 7 illustrates an exemplary temperature-process window-frequency graph.

Specifically, FIG. 7 shows a temperature-process window-frequency graph. This graph illustrates that, as a result of different statistical timing analyses performed on different groups of integrated circuit chips (i.e., different bins of integrated circuit chips) ranging in the process window from fast to slow, these groups may have significantly different temperature-frequency settings. FIG. 7 shows five different clock signal frequencies (Freq.1-Freq.5), wherein Freq.1 represents the lowest clock signal frequency to be used at the highest temperature and Freq. 5 represents the highest clock signal frequency to be used at the lowest temperatures. However, not all of these clock signal frequencies are required for all of the different groups and different clock signal frequencies may be used at different temperature ranges in one or more of the different groups. For example, given the temperature-frequency space of the fast group, the fast group may not require any frequency adjustments to the clock signal and, thus, may employ a clock signal with a mid-range frequency (e.g., Freq. 3) that remains constant with temperature changes. Given the temperature-frequency space of the slow group, the slow group may require multiple frequency adjustments to the clock signal (e.g., from Freq. 5 to Freq. 1) as the temperature increases. Given the temperature-frequency space of the mid-range group, the mid-range group may, like the slow group, require multiple frequency adjustments to the clock signal (e.g., from Freq. 5 to Freq. 1) as the temperature increases, but these adjustments may be made at different threshold temperatures.

The methods as described above can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

FIG. 8 shows a block diagram of an exemplary design flow 800 used for example, in semiconductor IC logic design, simulation, test, layout, and manufacture of an integrated circuit chip 110 as shown in the system 100A or 100B in FIGS. 1A and 1B, respectively. Design flow 800 includes processes, machines and/or mechanisms for processing design structures or devices to generate logically or otherwise functionally equivalent representations of the design structures and/or devices described above and shown in FIGS. 1A-1B. The design structures processed and/or generated by design flow 800 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 800 may vary depending on the type of representation being designed. For example, a design flow 800 for building an application specific IC (ASIC) may differ from a design flow 800 for designing a standard component or from a design flow 800 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 820 that is preferably processed by a design process 810. Design structure 820 may be a logical simulation design structure generated and processed by design process 810 to produce a logically equivalent functional representation of a hardware device. Design structure 820 may also or alternatively comprise data and/or program instructions that when processed by design process 810, generate a functional representation of the physical structure of a hardware device. Whether representing functional and/or structural design features, design structure 820 may be generated using electronic computer-aided design (ECAD) such as implemented by a core developer/designer. When encoded on a machine-readable data transmission, gate array, or storage medium, design structure 820 may be accessed and processed by one or more hardware and/or software modules within design process 810 to simulate or otherwise functionally represent an electronic component, circuit, electronic or logic module, apparatus, device, or system such as those shown in 20 and 22. As such, design structure 820 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher-level design languages such as C or C++.

Design process 810 preferably employs and incorporates hardware and/or software modules for synthesizing, translating, or otherwise processing a design/simulation functional equivalent of the components, circuits, devices, or logic structures shown in FIGS. 1A-1B to generate a Netlist 880 which may contain design structures such as design structure 820. Netlist 880 may comprise, for example, compiled or otherwise processed data structures representing a list of wires, discrete components, logic gates, control circuits, I/O devices, models, etc. that describes the connections to other elements and circuits in an integrated circuit design. Netlist 880 may be synthesized using an iterative process in which netlist 880 is resynthesized one or more times depending on design specifications and parameters for the device. As with other design structure types described herein, netlist 880 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 810 may include hardware and software modules for processing a variety of input data structure types including Netlist 880. Such data structure types may reside, for example, within library elements 830 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 840, characterization data 850, verification data 860, design rules 870, and test data files 885 which may include input test patterns, output test results, and other testing information. Design process 810 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 810 without deviating from the scope and spirit of the invention. Design process 810 may also include modules for performing standard circuit design processes such as timing analysis, verification, design rule checking, place and route operations, etc.

Design process 810 employs and incorporates logic and physical design tools such as HDL compilers and simulation model build tools to process design structure 820 together with some or all of the depicted supporting data structures along with any additional mechanical design or data (if applicable), to generate a second design structure 890. Design structure 890 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 820, design structure 890 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1A-1B. In one embodiment, design structure 890 may comprise a compiled, executable HDL simulation model that functionally simulates the devices shown in FIGS. 1A-1B.

Design structure 890 may also employ a data format used for the exchange of layout data of integrated circuits and/or symbolic data format (e.g. information stored in a GDSII (GDS2), GL1, OASIS, map files, or any other suitable format for storing such design data structures). Design structure 890 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1A-1B. Design structure 890 may then proceed to a stage 895 where, for example, design structure 890: proceeds to tape-out, is released to manufacturing, is released to a mask house, is sent to another design house, is sent back to the customer, etc.

Figure 9:
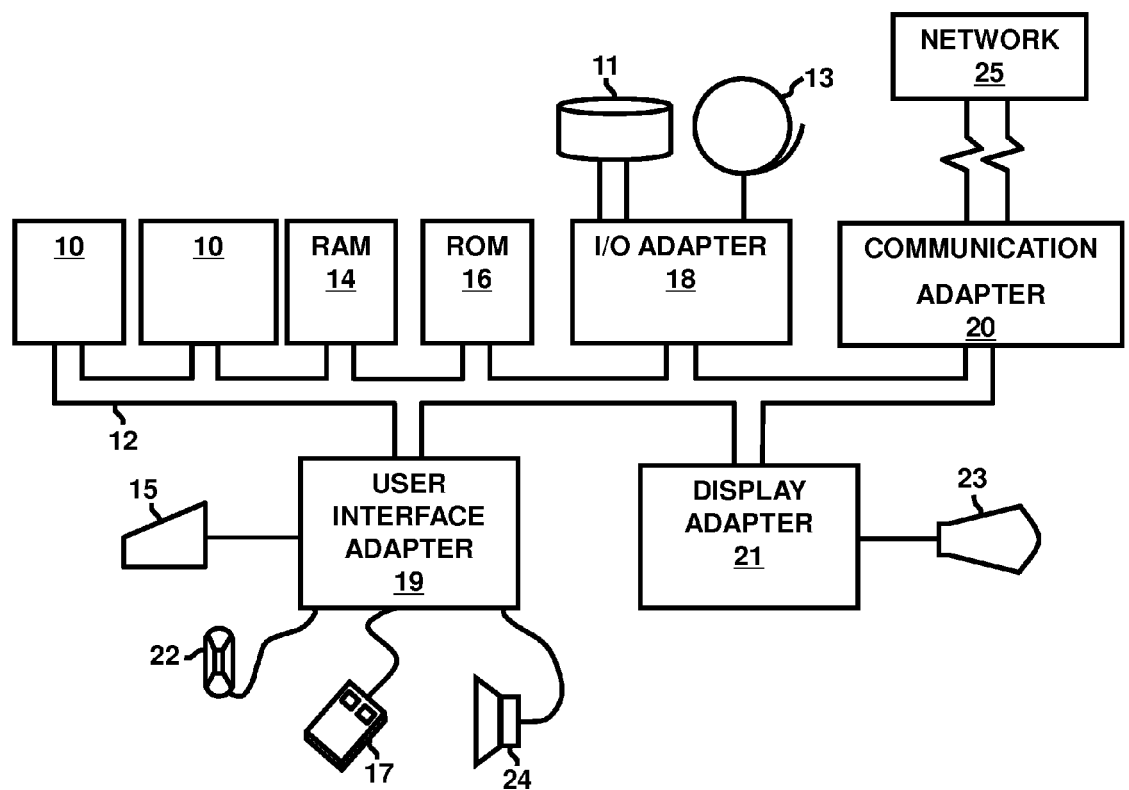
FIG. 9 is a schematic diagram illustrating representative hardware environment for implementing the various embodiments of the disclosed invention.

A representative hardware environment (i.e., a computer system) for implementing the above-described design flow, as well as the method for generating temperature-frequency settings during timing analysis, is depicted in FIG. 9. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are embodiments of a system and method that control integrated circuit chip temperature using frequency scaling based on predetermined temperature-frequency settings. Specifically, during integrated circuit chip operation, a controller causes a variable clock signal generator to adjust the frequency of a clock signal that coordinates operations of an integrated circuit chip based on the temperature of the integrated circuit chip and on predetermined temperature-frequency settings. The temperature-frequency settings are predetermined in order to ensure that the frequency of the clock signal, as adjusted, remains sufficiently high to meet a chip performance specification, but sufficiently low to prevent the temperature from rising above a predetermined maximum temperature in order to limit power consumption. Also disclosed above are embodiments of a method of generating such temperature-frequency settings during timing analysis.

What is claimed is:

1. A system comprising:
a temperature sensor determining a temperature of an integrated circuit chip;
a variable clock signal generator generating a clock signal that coordinates operations of said integrated circuit chip;
a memory storing temperature-frequency settings; and
a controller in communication with said sensor and said memory and operably connected to said variable clock signal generator,
said controller receiving an indication of said temperature from said temperature sensor, accessing said temperature-frequency settings, using said temperature-frequency settings to determine an optimal frequency for said clock signal given said temperature and causing said variable clock signal to adjust said clock signal such that said clock signal has said optimal frequency,
said temperature-frequency settings indicating the following:
a first frequency that is said optimal frequency when said temperature is below a first threshold temperature;
at least one second frequency that is said optimal frequency when said temperature is between said first threshold temperature and a second threshold temperature; and
a third frequency that is said optimal frequency when said temperature is above said second threshold temperature,
said first frequency, said at least one second frequency and said third frequency comprising different frequencies.

2. The system of claim 1, said temperature-frequency settings being predetermined during a timing analysis based on a design of said integrated circuit chip so that, when said temperature-frequency settings are used to adjust said clock signal, said optimal frequency is sufficiently high to meet a performance specification for said integrated circuit chip and sufficiently low to prevent said temperature from rising above a predetermined maximum temperature.

3. The system of claim 1, said at least one second frequency comprising multiple different second frequencies associated with multiple different temperature ranges between said first threshold temperature and said second threshold temperature.

4. The system of claim 1, said at least one second frequency comprising a single second frequency and said single second frequency being lower than said first frequency and said third frequency being lower than said second frequency.

5. The system of claim 1, said at least one second frequency comprising multiple second frequencies that increase linearly with increases in said temperature such that said temperature-frequency settings indicate a linear temperature-frequency relationship between a range of frequencies and a range of temperatures, said range of frequencies comprising: said first frequency that is a predetermined minimum frequency in said range of frequencies, said third frequency that is a predetermined maximum frequency in said range of frequencies and said multiple second frequencies.

6. The system of claim 1, said temperature sensor, said variable clock signal generator, said memory and said controller being on-chip components of said integrated circuit chip.

7. The system of claim 1, said temperature sensor and said variable clock signal generator being on-chip components of said integrated circuit chip and said memory and said controller being separate from said integrated circuit chip.

8. A method comprising:
receiving, by a controller from a temperature sensor, an indication of a temperature of an integrated circuit chip;
accessing, by said controller, temperature-frequency settings stored in a memory;
given said temperature, using, by said controller, said temperature-frequency settings to determine an optimal frequency for a clock signal that is generated by a variable clock signal generator and that coordinates operations of said integrated circuit chip; and,
causing, by said controller, said variable clock signal generator to adjust said clock signal such that said clock signal has said optimal frequency,
said temperature-frequency settings indicating the following:
a first frequency that is said optimal frequency when said temperature is below a first threshold temperature;
at least one second frequency that is said optimal frequency when said temperature is between said first threshold temperature and a second threshold temperature; and
a third frequency that is said optimal frequency when said temperature is above said second threshold temperature,
said first frequency, said at least one second frequency and said third frequency comprising different frequencies.

9. The method of claim 8, said temperature-frequency settings being predetermined during a timing analysis based on a design of said integrated circuit chip so that, when said temperature-frequency settings are used to adjust said clock signal, said optimal frequency of said clock signal remains sufficiently high to meet a performance specification for said integrated circuit chip and sufficiently low to prevent said temperature from rising above a predetermined maximum temperature.

10. The method of claim 8, said at least one second frequency comprising multiple different second frequencies associated with multiple different temperature ranges between said first threshold temperature and said second threshold temperature.

11. The method of claim 8,
said at least one second frequency comprising a single second frequency and said single second frequency being lower than said first frequency and said third frequency being lower than said second frequency.

12. The method of claim 8, said at least one second frequency comprising multiple second frequencies that increase linearly with increases in said temperature such that said temperature-frequency settings indicate a linear temperature-frequency relationship between a range of frequencies and a range of temperatures, said range of frequencies comprising: said first frequency that is a predetermined minimum frequency in said range of frequencies, said third frequency that is a predetermined maximum frequency in said range of frequencies and said multiple second frequencies.

13. The method of claim 8, said temperature sensor, said variable clock signal generator, said memory and said controller being on-chip components of said integrated circuit chip.

14. The method of claim 8, said temperature sensor and said variable clock signal generator being on-chip components of said integrated circuit chip and said memory and said controller being separate from said integrated circuit chip.

15. A method comprising:
creating a design for an integrated circuit chip;
determining a performance specification for said integrated circuit chip;
performing a timing analysis based on said design in order to characterize relationships between a frequency of a clock signal that coordinates operations of said integrated circuit chip and a performance parameter of said integrated circuit chip, between said frequency and a temperature of said integrated circuit chip and between said performance parameter and said temperature and to determine, based on said relationships, temperature-frequency settings for said integrated circuit chip; and,
storing said temperature-frequency settings in a memory, said memory being accessible by a controller that, after manufacture of said integrated circuit chip and incorporation of said integrated circuit chip into a product, performs the following: receives an indication of a temperature of an integrated circuit chip from a temperature sensor; accesses said temperature-frequency settings from said memory; given said temperature, uses said temperature-frequency settings to determine an optimal frequency for said clock signal; and, causes a variable clock signal generator to adjust said clock signal such that said clock signal has said optimal frequency,
said temperature-frequency settings being determined during said timing analysis so that, when said temperature-frequency settings are used to adjust said clock signal, said optimal frequency of said clock signal is sufficiently high to meet said performance specification and sufficiently low to prevent said temperature from rising above a predetermined maximum temperature, and
the method further comprising performing selective voltage binning to sort multiple integrated circuit chips having said design into different groups based on different operating speeds, said performance specification being determined and said timing analysis being performed following said performing of said selective voltage binning such that said temperature-frequency settings apply to a specific one of said different groups.

16. The method of claim 15, said temperature-frequency settings specifying a threshold temperature, a first frequency for said clock signal when said temperature is below said threshold temperature, and a second frequency for said clock signal when said temperature is above said threshold temperature, said second frequency being lower than said first frequency.

17. The method of claim 15, said temperature-frequency settings specifying multiple threshold temperatures and frequencies, said multiple threshold temperatures and frequencies comprising at least:
a first threshold temperature;
a second threshold temperature that is higher than said first threshold temperature;
a first frequency for said clock signal when said temperature is below said first threshold temperature,
a second frequency for said clock signal when said temperature is between said first threshold temperature and said second threshold temperature; and
a third frequency for said clock signal when said temperature is above said second threshold temperature,
said second frequency being lower than said first frequency and said third frequency being lower than said second frequency.

18. The method of claim 15, said temperature-frequency settings indicating a linear temperature-frequency relationship.

19. The method of claim 15, said timing analysis comprising a statistical static timing analysis.

* * * * *